US010550895B2

(12) United States Patent
Ohr

(10) Patent No.: US 10,550,895 B2
(45) Date of Patent: Feb. 4, 2020

(54) WEDGE PLATE CLUTCH WITH OFF-SET SNAP RINGS

(71) Applicant: Schaeffler Technologies AG & Co. KG, Herzogenaurach (DE)

(72) Inventor: Carsten Ohr, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 222 days.

(21) Appl. No.: 15/873,026

(22) Filed: Jan. 17, 2018

(65) Prior Publication Data

US 2019/0219105 A1   Jul. 18, 2019

(51) Int. Cl.
| F16D 41/06 | (2006.01) |
| F16D 13/16 | (2006.01) |
| F16D 41/066 | (2006.01) |
| F16D 41/063 | (2006.01) |
| F16D 15/00 | (2006.01) |

(52) U.S. Cl.
CPC ............ *F16D 13/16* (2013.01); *F16D 15/00* (2013.01); *F16D 41/063* (2013.01); *F16D 41/066* (2013.01)

(58) Field of Classification Search
CPC ...... F16D 13/16; F16D 41/066; F16D 41/063; F16D 41/06; F16D 15/00
See application file for complete search history.

(56) References Cited

U.S. PATENT DOCUMENTS

| 3,877,556 | A | 4/1975 | Brownscombe |
| 2013/0341147 | A1 | 12/2013 | Buchanan |
| 2014/0041982 | A1 | 2/2014 | Chien |
| 2014/0110207 | A1* | 4/2014 | Davis ..................... F16D 41/08 |
| | | | 192/45.1 |
| 2015/0323018 | A1 | 11/2015 | Hemphill et al. |
| 2016/0032988 | A1* | 2/2016 | He ........................ F16D 41/063 |
| | | | 192/45.1 |
| 2016/0138662 | A1* | 5/2016 | He ........................ F16D 41/063 |
| | | | 192/45.1 |
| 2017/0198761 | A1 | 7/2017 | Ince et al. |

FOREIGN PATENT DOCUMENTS

JP    2003056604 A    2/2003

* cited by examiner

*Primary Examiner* — Jacob S. Scott
*Assistant Examiner* — Lillian T Nguyen

(57) ABSTRACT

A wedge plate clutch, including: inner and outer rings; circumferentially aligned wedge plate segments radially disposed between the inner and outer rings; a plurality of snap rings urging the circumferentially aligned wedge plate segments radially outwardly; and a cage. The plurality of snap rings includes: a first snap ring with a first circumferential gap; and a second snap ring with a second circumferential gap. The second circumferential gap is circumferentially off-set from the first circumferential gap. For a disconnect mode for the wedge plate clutch, the inner ring and the outer ring are rotatable with respect to each other. To transition from the disconnect mode to a connect mode for the wedge plate clutch, in which the inner and outer rings are non-rotatably connected, the cage is arranged to displace the circumferentially aligned wedge plate segments.

20 Claims, 15 Drawing Sheets

WEDGE PLATE CLUTCH WITH OFF-SET SNAP RINGS

TECHNICAL FIELD

The present disclosure relates to a wedge plate clutch with off-set snap rings to distribute radial force to wedge plate segments.

BACKGROUND

FIG. 14 is a front view of a prior art wedge plate clutch 200. Clutch 200 includes inner ring 202; outer ring 204 located radially outwardly of inner ring 202; circumferentially aligned wedge plate segments 206 radially disposed between inner ring 202 and outer ring 204; and snap ring 208. Snap ring 208 includes circumferential gap 210. That is, snap ring 208 is discontinuous at gap 210.

As is known in the art, for a disconnect mode for clutch 200, in which inner rings 202 and 204 are rotatable with respect to each other, it is necessary to prevent frictional contact between segments 206 and inner ring 202, which can result in an unintended transition to a connect mode for clutch 200, in which ring 202, segments 206, and ring 204 are non-rotatably connected. Snap ring 208 is provided with the intent to perform the preceding function. However, once installed, snap ring 208 assumes an ovoid, rather than a circular shape, about major axis MA. As a result, snap ring 208 urges only a portion of segments 206 radially outwardly into contact with outer ring 204 and out of contact with inner ring 202. For example, segments 206J, 206A bracketing one end of major axis MA at gap 210, and segments 206D and 206E and 206F and 206G, bracketing the other end of major axis MA, are urged into contact with ring 204 by snap ring 208. Segments 206B, 206C, 206H, and 206I: are not urged into contact with ring 204 by snap ring 208; and during the disconnect mode, may contact ring 202, initiating the unintended transition to the locked mode. It should be understood that other groupings of segments 206 can be urged into contact with ring 204 depending for example on where gap 210 is placed; however, there is no arrangement in which snap ring 208 urges all of segments 206 into contact with ring 204.

SUMMARY

According to aspects illustrated herein, there is provided a wedge plate clutch, including: an axis of rotation; an inner ring; an outer ring located radially outwardly of the inner ring; a plurality of circumferentially aligned wedge plate segments radially disposed between the inner ring and the outer ring; a plurality of snap rings urging the plurality of circumferentially aligned wedge plate segments in a radial direction; and a cage. The plurality of snap rings includes: a first snap ring with a first circumferential gap; and a second snap ring with a second circumferential gap. The second circumferential gap is circumferentially off-set from the first circumferential gap. For a disconnect mode for the wedge plate clutch, the inner ring and the outer ring are rotatable with respect to each other. To transition from the disconnect mode to a connect mode for the wedge plate clutch, in which the inner and outer rings are non-rotatably connected, the cage is arranged to displace the first plurality of circumferentially aligned wedge plate segments.

According to aspects illustrated herein, there is provided a wedge plate clutch, including: an axis of rotation; an inner ring; an outer ring located radially outwardly of the inner ring; a first plurality of circumferentially aligned wedge plate segments radially disposed between the inner ring and the outer ring; a plurality of snap rings urging the plurality of circumferentially aligned wedge plate segments in a radial direction; and a cage. The plurality of snap rings includes: a first snap ring urging a first wedge plate segment, included in the first plurality of circumferentially aligned wedge plate segments, in the radial direction; and a second snap ring urging a second wedge plate segment, included in the first plurality of circumferentially aligned wedge plate segments, in the radial direction. The first snap ring does not urge the second wedge plate segment in the radial direction. For a disconnect mode for the wedge plate clutch, the inner ring and the outer ring are rotatable with respect to each other. To transition from the disconnect mode to a connect mode for the wedge plate clutch, in which the inner and outer rings are non-rotatably connected, the cage is arranged to circumferentially displace the first plurality of circumferentially aligned wedge plate segments.

According to aspects illustrated herein, there is provided a wedge plate clutch, including: an axis of rotation; an inner ring; an outer ring located radially outwardly of the inner ring; a plurality of circumferentially aligned wedge plate segments radially disposed between the inner ring and the outer ring; a plurality of snap rings urging the plurality of circumferentially aligned wedge plate segments radially outwardly; and a cage. The plurality of snap rings includes: a first snap ring with a first circumferential gap; a second snap ring with a second circumferential gap; and a third snap ring with a third circumferential gap. No line, parallel to the axis of rotation passes through the first circumferential gap, the second circumferential gap and the third circumferential gap. For a disconnect mode for the wedge plate clutch, the inner ring and the outer ring are rotatable with respect to each other. To transition from the disconnect mode to a connect mode for the wedge plate clutch, in which the inner and outer rings are non-rotatably connected, the cage is arranged to displace the first plurality of circumferentially aligned wedge plate segments.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 15:
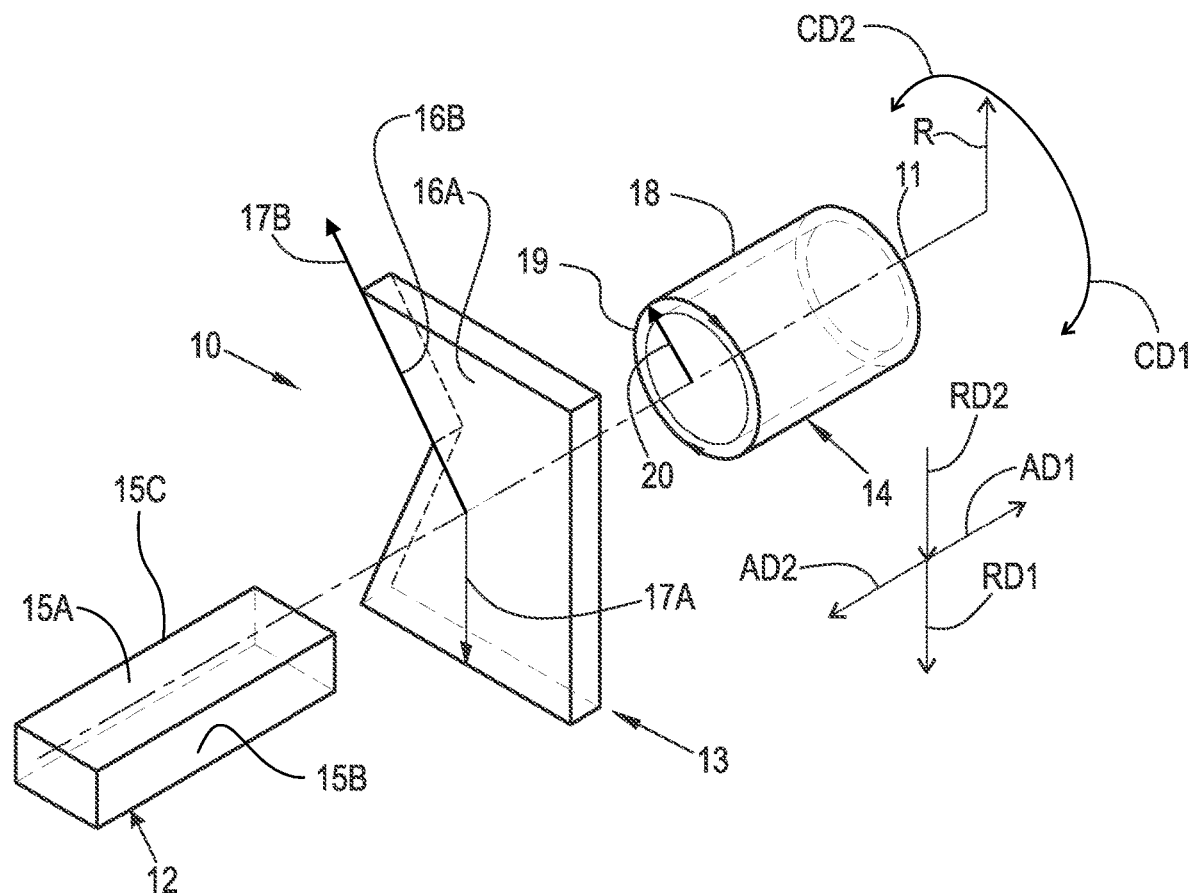

FIG. 15 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
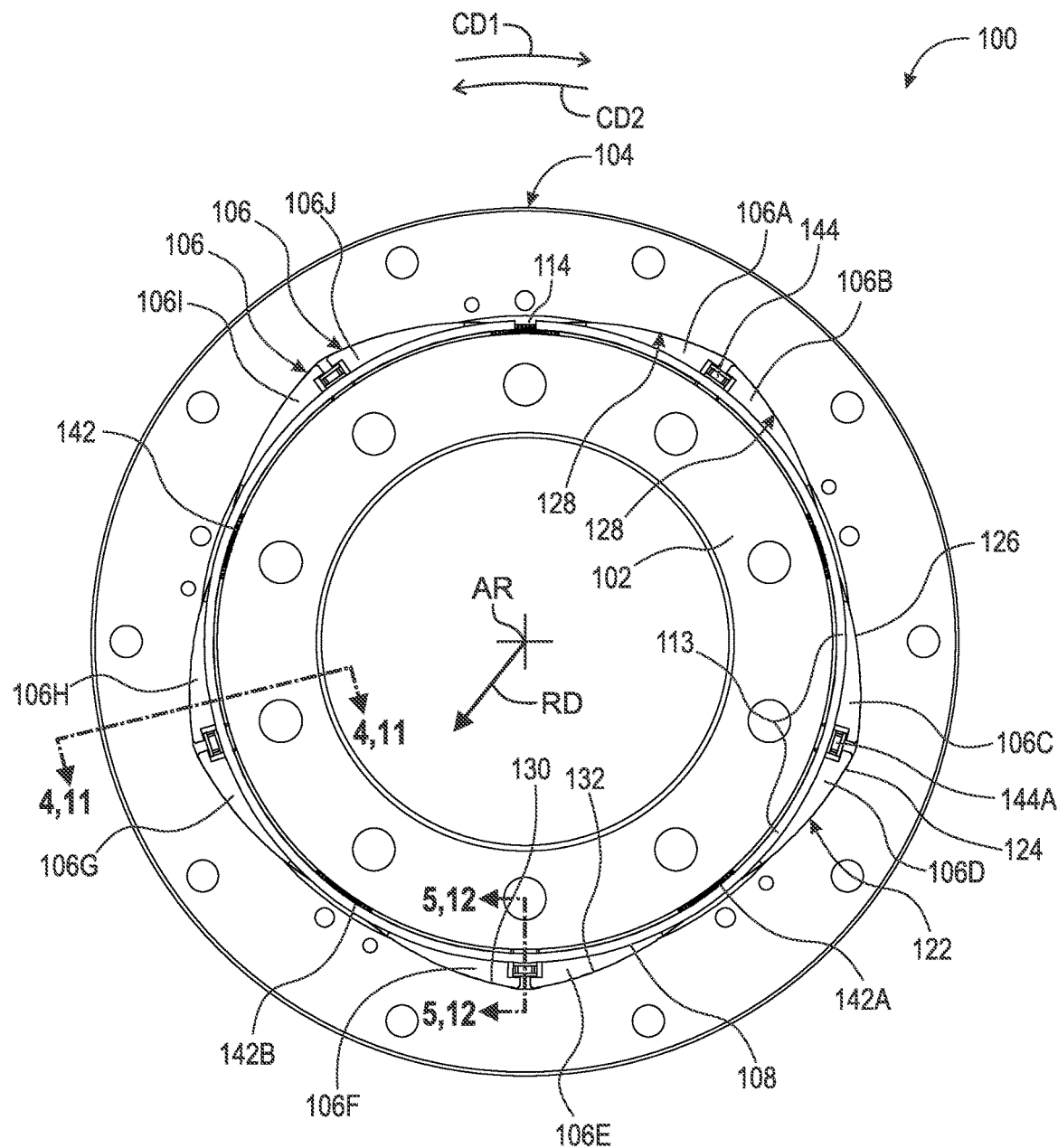
FIG. 1 is a front view of an example wedge plate clutch, with multiple off-set snap rings, in a disconnect mode.

FIG. 1 is a front view of example wedge plate clutch 100, with multiple off-set snap rings, in a disconnect mode.

Figure 2:
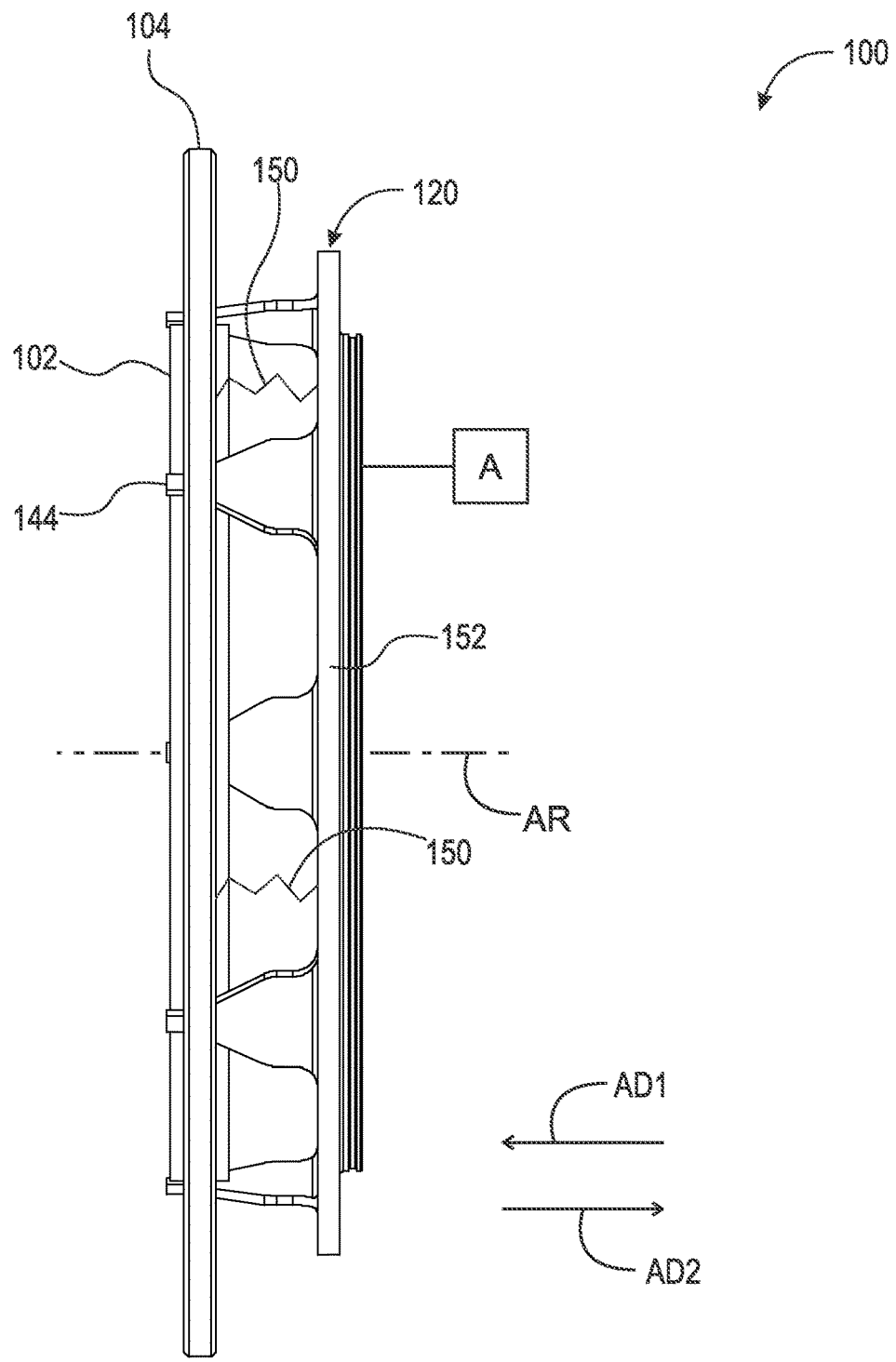
FIG. 2 is a side view of the wedge plate clutch of FIG. 1.

FIG. 2 is a side view of wedge plate clutch 100 of FIG. 1.

Figure 3:
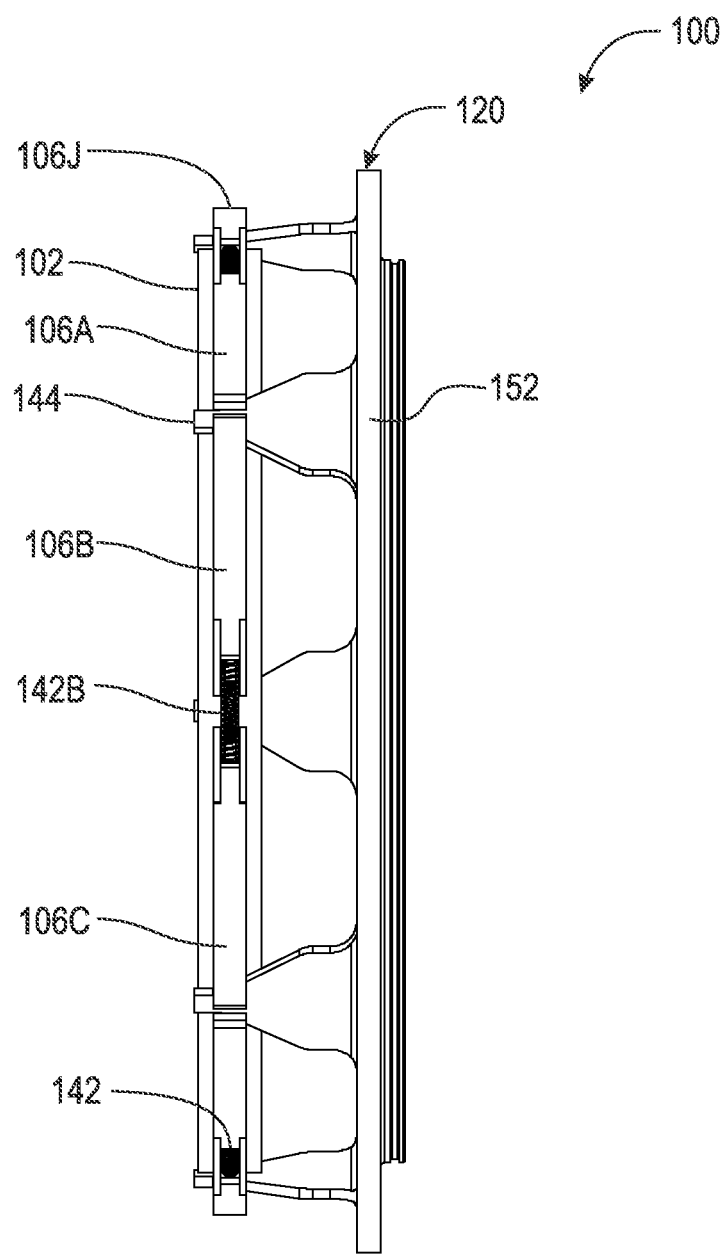
FIG. 3 is the side view of FIG. 2 with an outer ring removed.

FIG. 3 is a side view of wedge plate clutch 100 of FIG. 2 with an outer ring removed.

Figure 4:
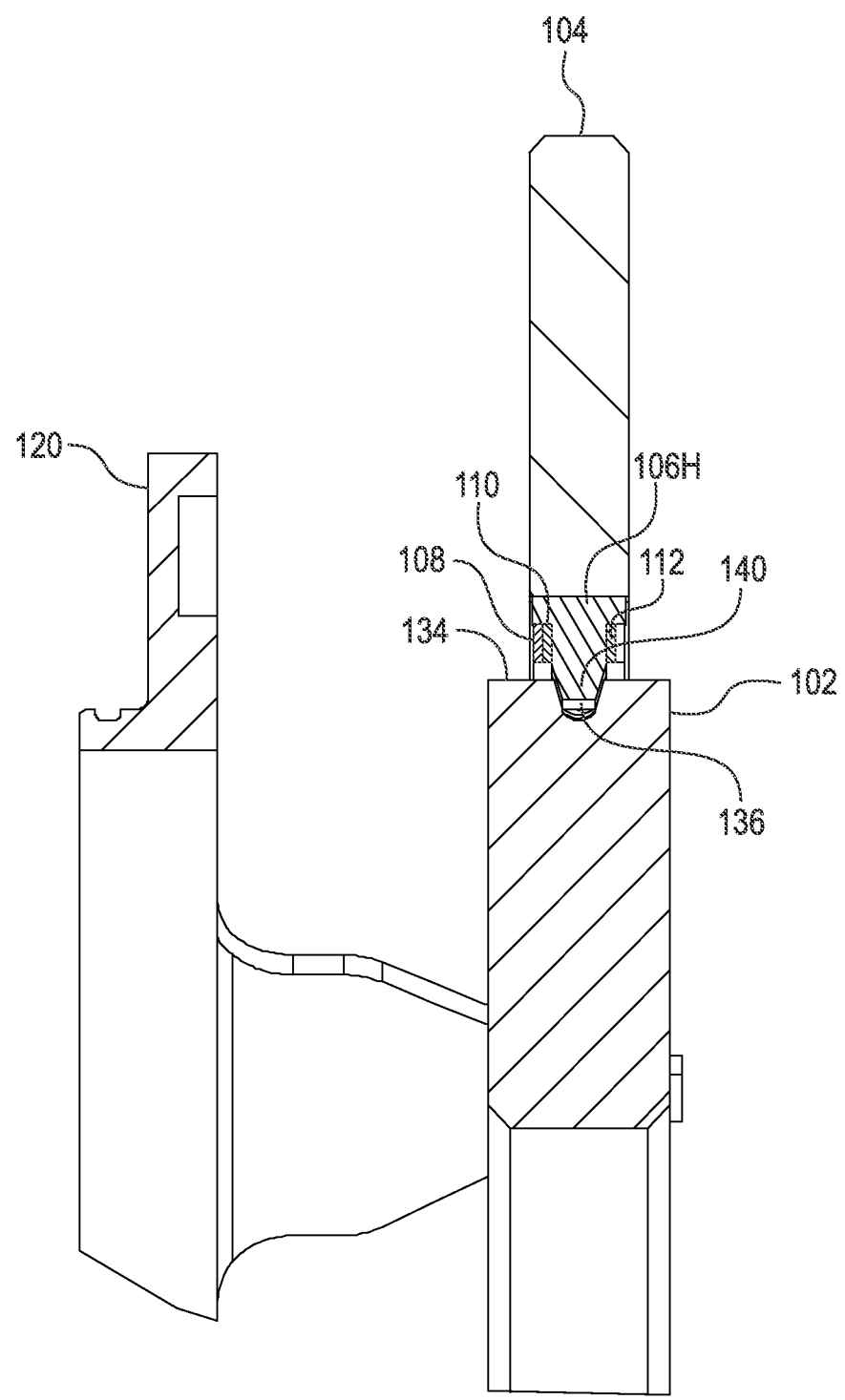
FIG. 4 a cross-sectional view generally along line 4/11-4/11 in FIG. 1 with three off-set snap rings.

FIG. 4 a cross-sectional view generally along line 4/11-4/11 in FIG. 1 with three off-set snap rings.

Figure 5:
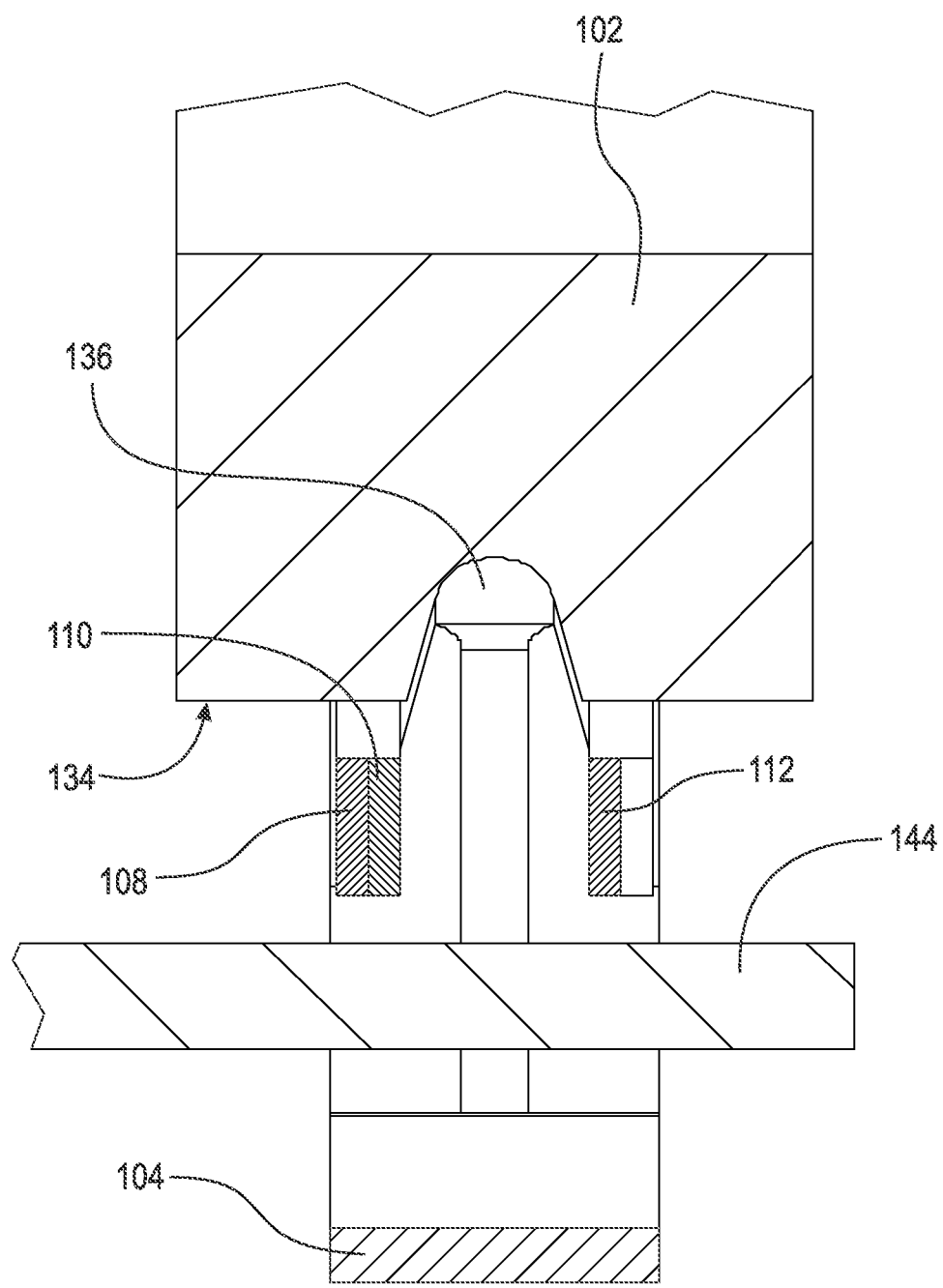
FIG. 5 a cross-sectional view generally along line 5/12-5/12 in FIG. 1 with three off-set snap rings.

FIG. 5 a cross-sectional view generally along line 5/12-5/12 in FIG. 1 with three off-set snap rings. The following should be viewed in light of FIGS. 1 through 5. Clutch 100 includes axis of rotation AR; inner ring 102; outer ring 104 located radially outwardly of inner ring 102; circumferentially aligned wedge plate segments 106 radially disposed between inner ring 102 and outer ring 104; and snap rings 108, 110, and 112. Snap rings 108, 110, and 112 urge every wedge plate segment 106 in a radial direction. In an example embodiment, the radial direction is radial outward direction RD and snap rings 108, 110, and 112 urge segments 106 radially outwardly into contact with outer ring 104. In the example of FIG. 1, clutch 100 includes pairs 113 of wedge plate segments 106. In the example of FIG. 1, segments 106 are paired as follows: 106A and 106B; 106C and 106D; 106E and 106F; 106G and 106H; 106I and 106J. In general, a reference character "[digit][digit][digit][letter]" designates a specific example of an element labeled as "[digit][digit][digit]." For example, wedge plate segment 106A is a specific example from among wedge plate segments 106.

Figure 6:
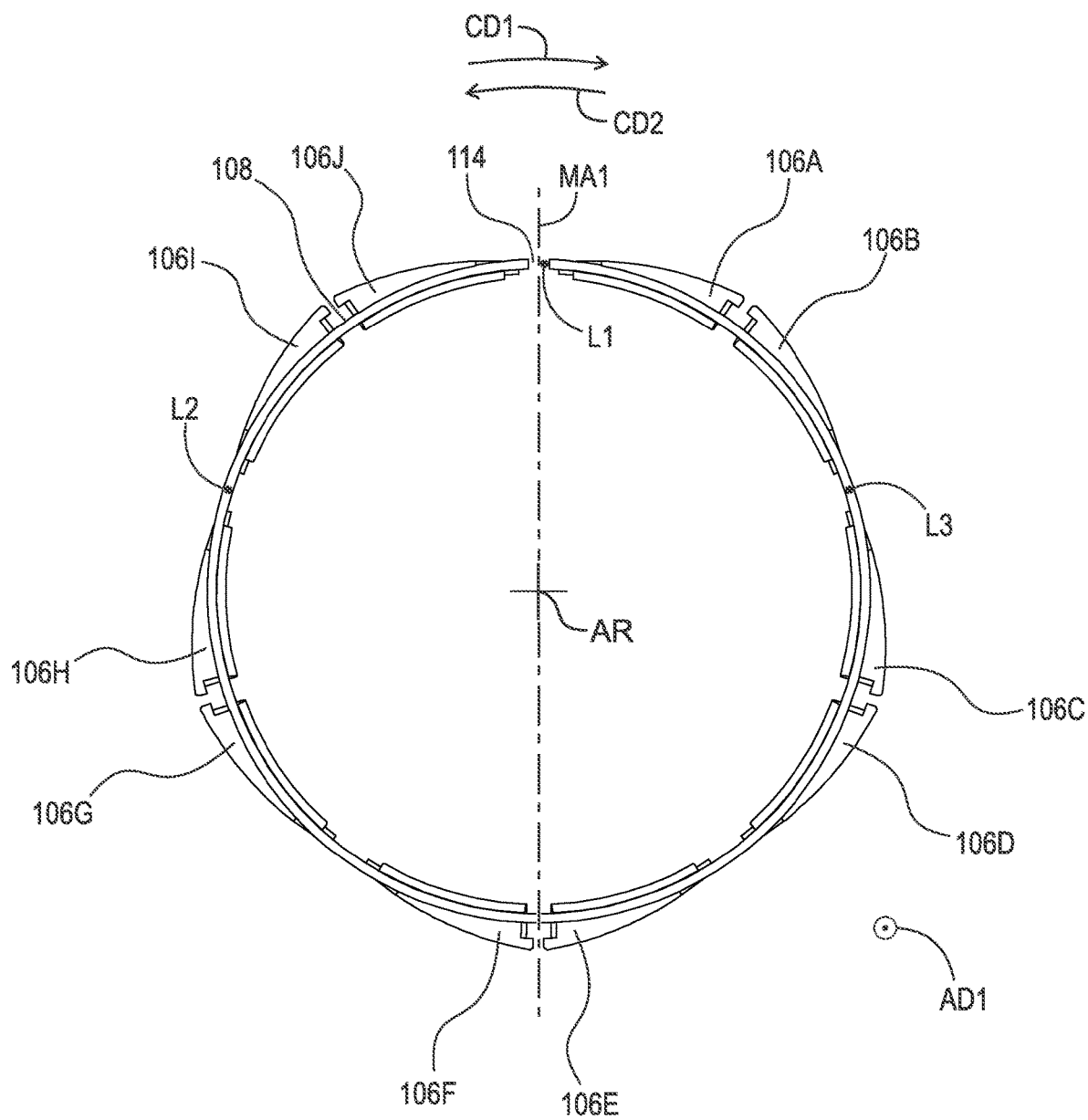
FIG. 6 is a front view of wedge plate segments and a first snap ring for the wedge plate clutch of FIGS. 4 and 5.

FIG. 6 is a front view of wedge plate segments 106 and snap ring 108 for wedge plate clutch 100 of FIGS. 4 and 5.

Figure 7:
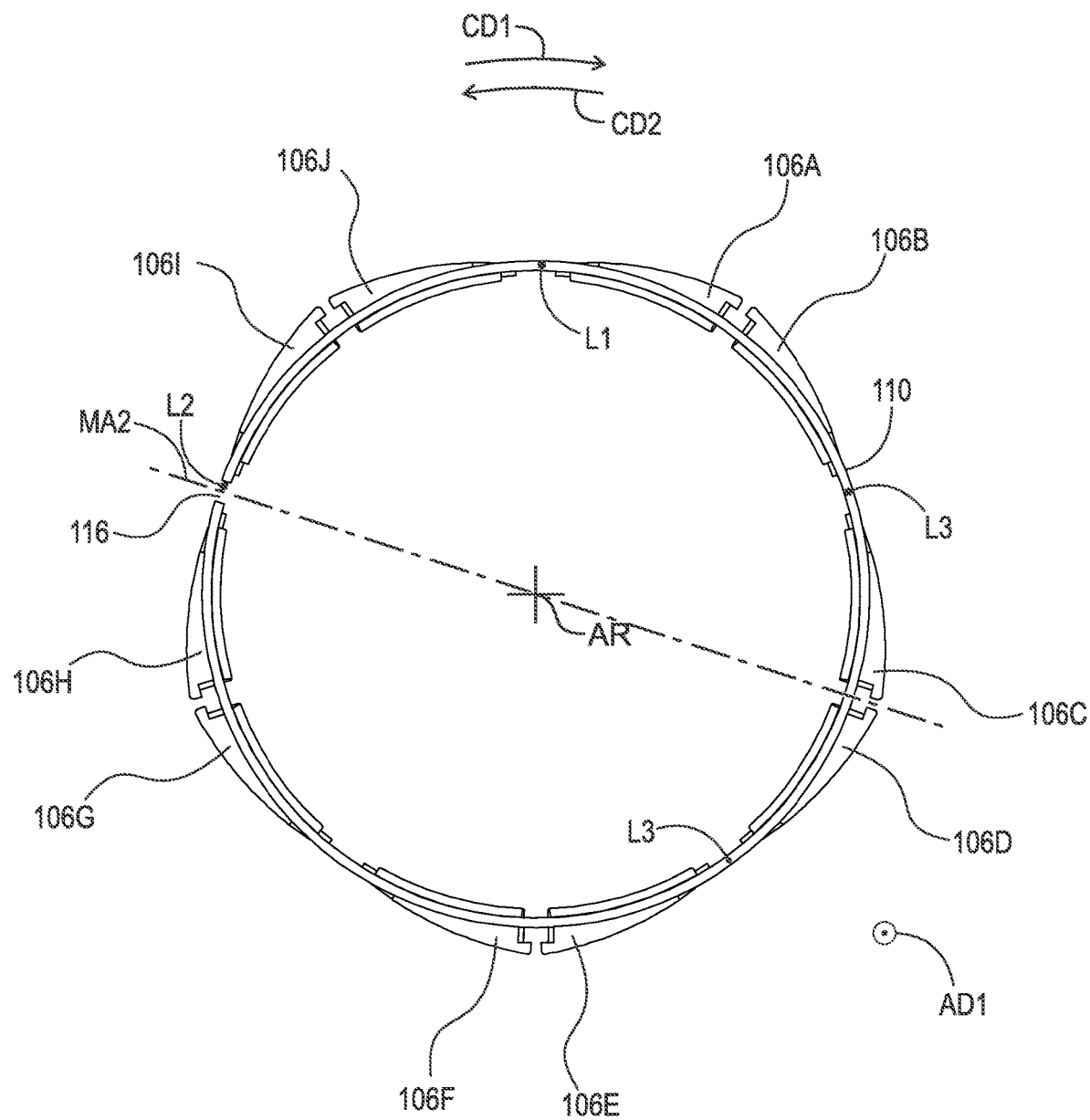
FIG. 7 is a front view of the wedge plate segments and a second snap ring for the wedge plate clutch of FIGS. 4 and 5.

FIG. 7 is a front view of wedge plate segments 106 and snap ring 110 for wedge plate clutch 100 of FIGS. 4 and 5.

Figure 8:
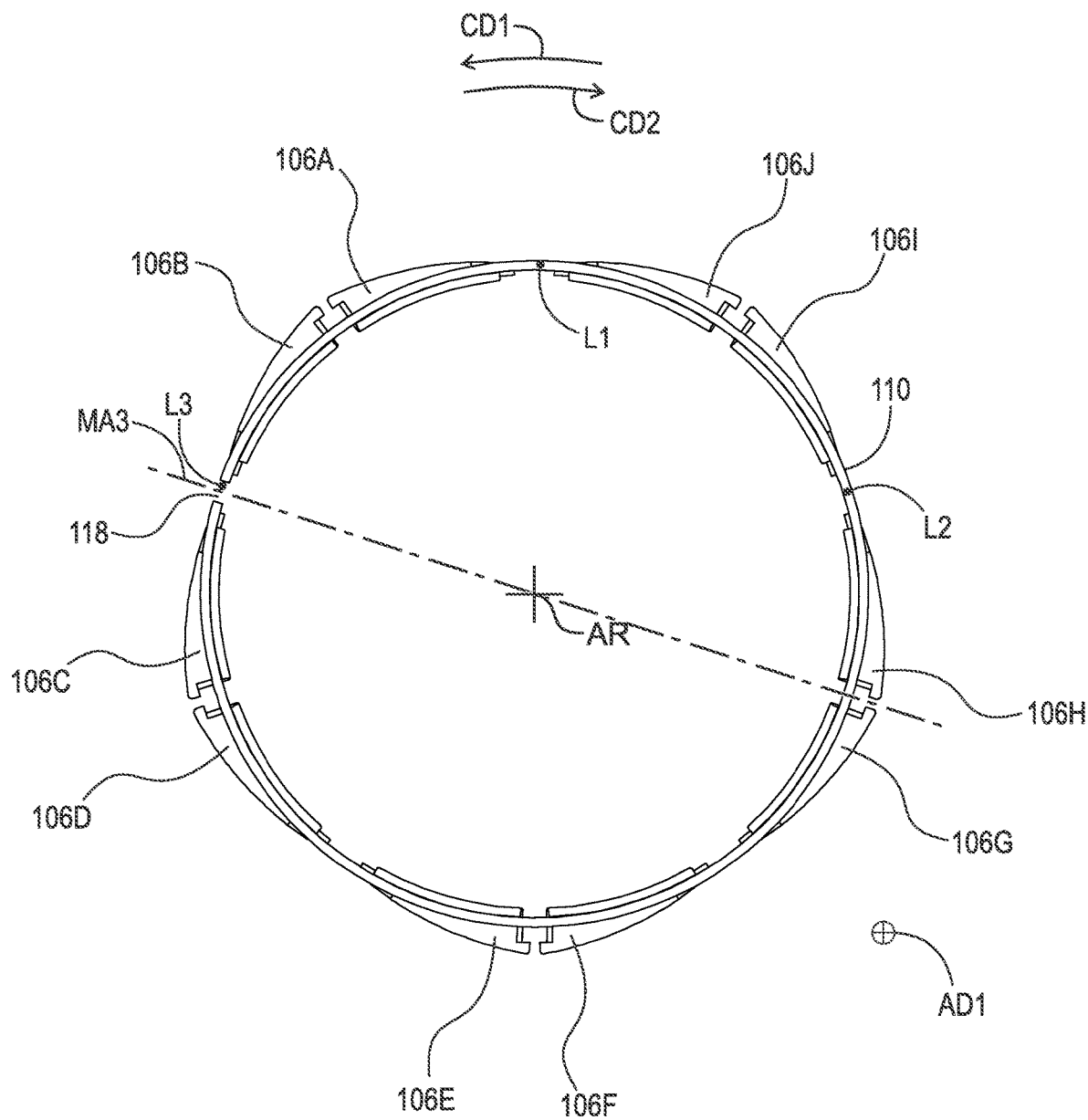
FIG. 8 is a back view of the wedge plate segments and a third snap ring for the wedge plate clutch of FIGS. 4 and 5.

FIG. 8 is a back view of wedge plate segments 106 and snap ring 112 for wedge plate clutch 100 of FIGS. 4 and 5. The following should be viewed in light of FIGS. 1 through 8. Snap ring 110 is axially disposed between snap rings 108 and 112. In an example embodiment, snap ring 108 is in contact with snap ring 110. In an example embodiment, segments 106 are axially disposed between two of snap rings 108, 110 and 112 and the other of snap rings 108, 110 and 112. In an example embodiment (not shown), all of snap rings 108, 110 and 112 are on one axial side of segments 106. Snap ring 108 includes circumferential gap 114. That is, snap ring 108 is discontinuous at gap 114. Snap ring 110 includes circumferential gap 116. That is, snap ring 110 is discontinuous at gap 116. Snap ring 112 includes circumferential gap 118. That is, snap ring 112 is discontinuous at gap 118.

Gaps 114, 116, and 118 are circumferentially off-set from each other. That is, no portion of one of gaps 114, 116, or 118 is axially aligned with any of the other of gaps 114, 116, and 118. For example: no line, parallel to axis AR, passes through gaps 114 and 116; no line, parallel to axis AR, passes through gaps 114 and 118; no line, parallel to axis AR, passes through gaps 116 and 118; and no line, parallel to axis AR, passes through gaps 114, 116 and 118. For example: line L1, parallel to axis AR, passes through gap 114 without passing through gap 116 or gap 118; line L2, parallel to axis AR, passes through gap 116 without passing through gap 114 or gap 118; and line L3, parallel to axis AR, passes through gap 118 without passing through gap 114 or gap 116.

Figure 9:
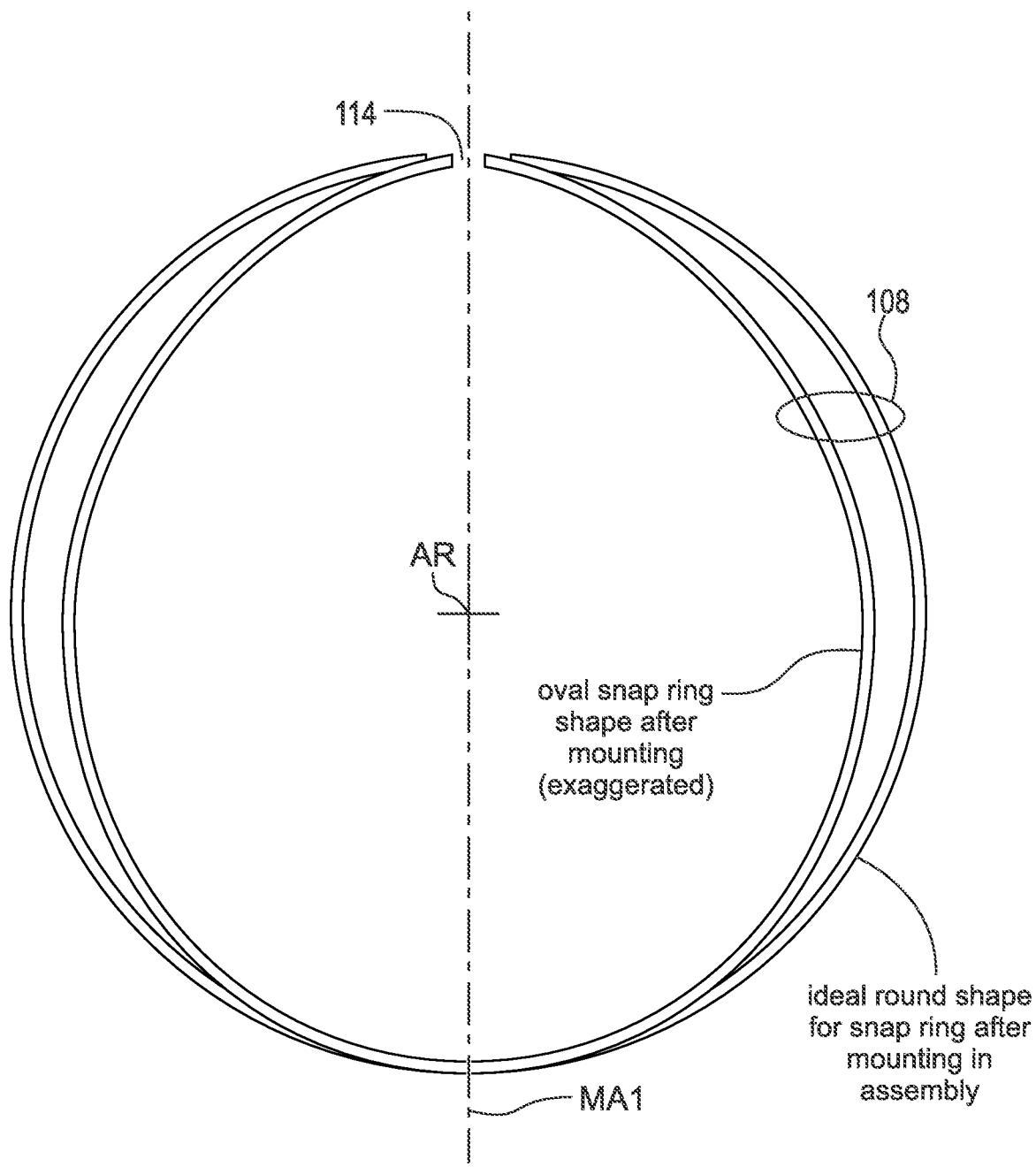
FIG. 9 is a front view showing an ideal circular shape and an actual ovoid shape for a snap ring in the wedge plate clutch of FIG. 1.

FIG. 9 is a front view showing an ideal circular shape and an actual ovoid shape for a snap ring in wedge plate clutch 100 of FIG. 1. As noted in FIG. 9, the degree of the ovoid shape is exaggerated. In the example of FIGS. 4 and 5: gap 114 is circumferentially located between segments 106J and 106A; gap 116 is circumferentially located between segments 106H and 106I; and gap 118 is circumferentially located between segments 106B and 106C. As noted above and illustrated in FIG. 9, snap rings installed in a wedge plate clutch assume a non-ideal, ovoid, rather than ideal circular shape. Major axis MA1, MA2 and MA3 for snap rings 108, 110, and 112, respectively, pass through axis AR and gaps 114, 116, and 118, respectively. In the example of FIGS. 4 and 5: axis MA1 passes through gap 114 without passing through a segment 106; axis MA2 passes through gap 116 without passing through a segment 106; and axis MA3 passes through gap 118 without passing through a segment 106. It should be understood that some or all of gaps 114, 116, and 118 can be radially aligned with respective segments 106, such that a respective major axis passes through a respective segment 106.

Due to the ovoid shapes of snap rings 108, 110, and 112 when installed in clutch 100, not every segment 106 is urged radially outwardly by any one of snap rings 108, 110, or 112. That is, each snap ring 108, 110, or 112 urges only some of segments 106 radially outwardly. For example, respective segments 106 are urged radially outwardly by: portions of snap rings 108, 110, and 112 bounding gaps 114, 116, and 118, respectively; and/or portions of snap rings 108, 110, and 112 bounding the juncture of major axis MA1, MA2 and MA3 with snap rings 108, 110, and 112, respectively.

In an example embodiment: snap ring 108 urges wedge plate segments 106J, 106A, 106D, 106E, 106F, and 106G radially outwardly into contact with outer ring 104; snap ring 110 urges wedge plate segments 106H, 106I, 106B, 106C, 106D, and 106E radially outwardly into contact with outer ring 104; and snap ring 112 urges wedge plate segments 106B, 106C, 106F, 106G, 106H, and 106I radially outwardly into contact with outer ring 104. Snap ring 108 does not urge segments 106B, 106C, 106H, and 106I radially outwardly. Snap ring 110 does not urge segments 106J, 106A, 106F, and 106G radially outwardly. Snap ring 112 does not urge segments 106D, 106E, 106J, and 106A radially outwardly.

Thus, every wedge plate 106 is urged radially outwardly into contact with ring 104 by at least one of snap rings 108, 110, or 112. In the example of FIG. 1, every segment 106 except segments 106J and 106A are urged radially outwardly by two of snap rings 108, 110, and 112.

Clutch 100 includes cage 120. For a disconnect mode for wedge plate clutch 100, inner ring 102 and outer ring 104 are rotatable with respect to each other. For example, ring 102 is rotatable with respect to ring 104 and segments 106. For a connect mode for wedge plate clutch 100, inner ring 102 and outer ring 104 are non-rotatably connected via wedge plate segments 106. To transition from the disconnect mode to the connect mode for the wedge plate clutch, cage 120 is arranged to displace wedge plate segments 106 as further described below. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

Outer ring 104 includes radially inner surface 122 with ramps 124 and ramps 126. Ramps 124 slope radially inwardly in circumferential direction CD1 and ramps 126 slope radially inwardly in circumferential direction CD2, opposite direction CD1. Each segment 106 includes radially outer surface 128. For each pair 113 of segments 106: surface 128 for one of the segments 106 includes ramp 130 sloping radially inwardly in direction CD1; and surface 128 for the other of the segments 106 includes ramp 132 sloping radially inwardly in direction CD2. Inner ring 102 includes radially outer surface 134 with groove 136. Each segment 106 includes at least one protrusion 140 disposed in groove 136. As further described below, for transition from the disconnect mode to the connect mode, a combination of ramps 124, 126, 130 and 132 displace segments 106 radially inwardly so that frictional contact between protrusions 140 and inner ring 102 at groove 136 is initiated or increased.

Springs 142 are circumferentially disposed between respective pairs 113 and urge segments 106 in each pair 113 circumferentially toward each other. For example: spring 142A urges segment 106E toward segment 106F in direction CD1 and segment 106D toward segment 106C in direction CD2; and spring 142B urges segment 106G toward segment 106H in direction CD1 and segment 106F toward segment 106E in direction CD2. Thus, for the disconnected mode: springs 142 and snap rings 108, 110, and 112: slide ramps 130 radially outwardly along ramps 124; slide ramps 132 radially outwardly along ramps 126; and therefore, displace segments 106 radially outwardly to reduce or eliminate frictional contact between segments 106 and inner ring 102.

Figure 10:
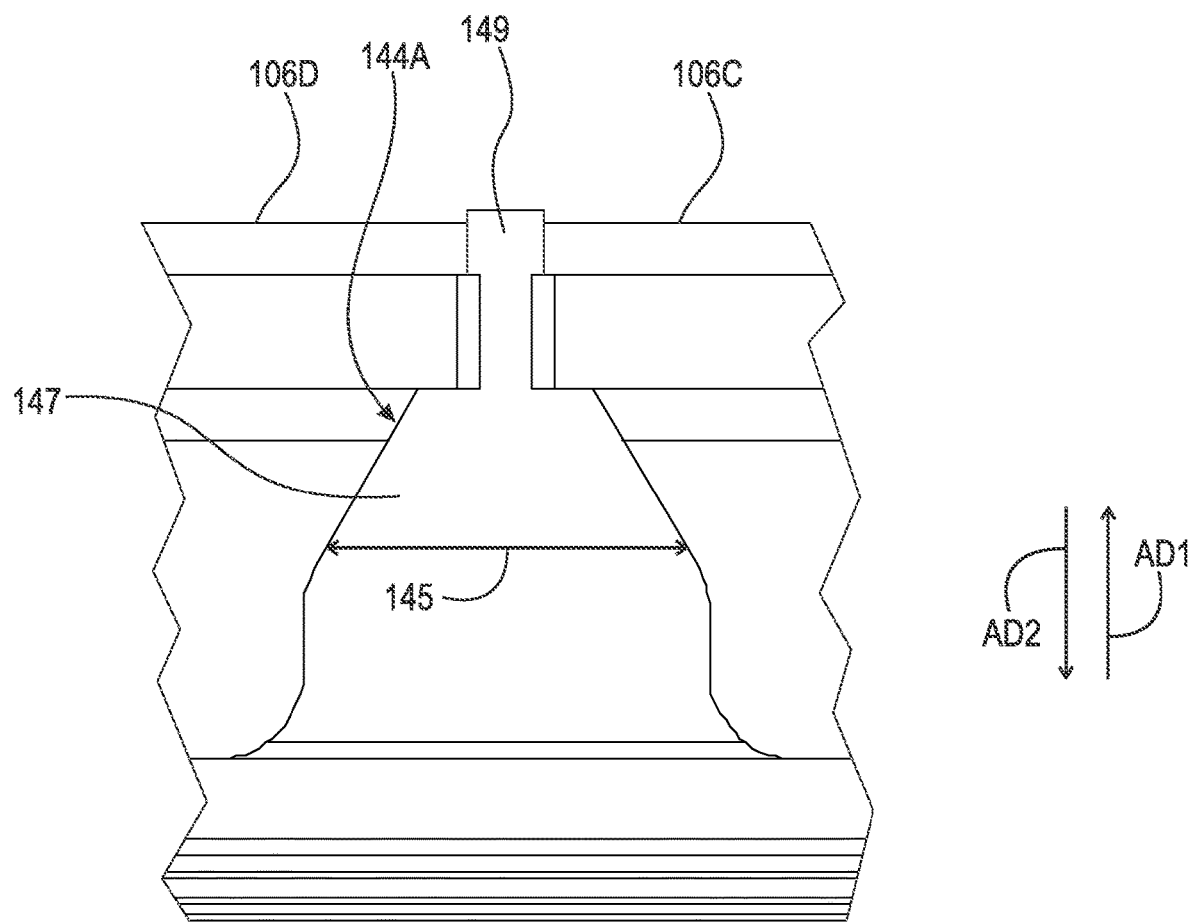
FIG. 10 is a side view detail of the wedge plate clutch of FIG. 1 with an outer ring removed, showing a wedge for a cage.

FIG. 10 is a side view detail of wedge plate clutch 100 of FIG. 1 with outer ring 104 removed, showing a wedge for cage 120. The following should be viewed in light of FIGS. 1 through 10. The following provides further detail regarding the structure and function of clutch 100. In the example of FIG. 1, cage 120 includes wedges 144. Each wedge 144 is circumferentially disposed between segments 106 for a respective pair 113 and includes tapered portion 147 and distal portion 149. For example, wedge 144A is disposed between segments 106C and 106D. Portions 147 taper inwardly (decrease in directions CD1 and CD2) in axial direction AD1. That is, circumferential width 145 of portions 147 decreases in direction AD1. Distal portions 149 circumferentially separate the segments 106 in each pair 113 in the disconnect mode.

To transition from the disconnect mode to the connect mode for relative rotation of inner ring 102, with respect to outer ring 104, in direction CD1: actuator A displaces cage 120 and wedges 144 in axial direction AD1. Due to the taper of portions 147, displacement of wedges 144 in direction AD1 forces the segments 106 in each pair 113 of segments 106 circumferentially apart from each other. Thus, wedges 144 slide, or push, ramps 130 radially inwardly along ramps 124 in direction CD1. Segments 106 with ramps 130: frictionally engage inner ring 102 or increase existing frictional engagement with inner ring 102 (via protrusions 140 in grooves 136); rotate with inner ring 102 and with respect to outer ring 104 in direction CD1; are compressively engaged between inner ring 102 and outer ring 104; and non-rotatably connect with inner ring 102 and outer ring 104. By components "compressively engaged between" two elements, we mean that: one element, for example ring 102, exerts a normal force on the component, for example, segments 106; and the other element, for example, ring 104

(ramps 124), exerts a normal force on the component. Thus, the two element squeeze the component between them.

Once in the connect mode, rings 102 and 104 rotate together in direction CD1. As further described below, as long as cage 120 remains engaged with segments 106, clutch 100 remains in the connect mode regardless of the direction of torque applied to clutch 100 or a direction of rotation of rings 102 and 104. For segments 106 with ramps 132, snap rings 108, 110, and/or 112 slide ramps 132 radially outwardly along ramps 126, decreasing or eliminating frictional contact between inner ring 102 and segments 106 with ramps 132.

To transition from the connect mode to the disconnect mode for rotation of inner ring 102 and outer ring 104 in direction CD1: cage 120 is displaced in direction AD2; and rotational torque is removed from clutch 100 or rotational torque on clutch 100 is reversed. For segments 106 with ramps 130: snap rings 108, 110, and 112 and springs 142 displace ramps 130 radially outwardly and circumferentially along ramps 124, decreasing or eliminating frictional contact between those segments 106 with ramps 130 and ring 102.

To transition from the disconnect mode to the connect mode for relative rotation of inner ring 102, with respect to outer ring 104, in direction CD2: actuator A displaces cage 120 and wedges 144 in axial direction AD1. Due to the taper of portions 147, displacement of wedges 144 in direction AD1 forces the segments 106 in each pair 113 of segments 106 circumferentially apart from each other. Thus, wedges 144 slide, or push, ramps 132 radially inwardly along ramps 126 in direction CD2. Segments 106 with ramps 132: frictionally engage inner ring 102 or increase existing frictional engagement with inner ring 102 (via protrusions 140 in grooves 136); rotate with inner ring 102 and with respect to outer ring 104 in direction CD2; are compressively engaged between inner ring 102 and outer ring 104; and non-rotatably connect with inner ring 102 and outer ring 104. Ramps 130 slide radially outwardly along ramps 124, decreasing or eliminating frictional contact between inner ring 102 and segments 106 with ramps 130.

Once in the connect mode, rings 102 and 104 rotate together in direction CD2. As further described below, as long as cage 120 remains engaged with segments 106, clutch 100 remains in the connect mode regardless of the direction of torque applied to clutch 100 or a direction of rotation of rings 102 and 104. For segments 106 with ramps 130, snap rings 108, 110, and/or 112 slide ramps 130 radially outwardly along ramps 124, decreasing or eliminating frictional contact between inner ring 102 and segments 106 with ramps 130.

To transition from the connect mode to the disconnect mode for rotation of inner ring 102 and outer ring 104 in direction CD2: cage 120 is displaced in direction AD2; and rotational torque is removed from clutch 100 or rotational torque on clutch 100 is reversed. For segments 106 with ramps 132: snap rings 108, 110, and 112 and springs 142 displace ramps 132 radially outwardly and circumferentially along ramps 126, decreasing or eliminating frictional contact between those segments 106 with ramps 132 and ring 102.

As noted above, as long as cage 120 remains engaged with segments 106, clutch 100 remains in the connect mode regardless of the direction of torque applied to clutch 100 or a direction of rotation of rings 102 and 104. For example, assume clutch 100 is in a drive train of a vehicle, inner ring 102 is rotated in direction CD1 by an engine for the vehicle, and clutch 100 is in the connect mode. When the engine accelerates, torque is applied to inner ring 102 in direction CD1 while inner ring 102 and outer ring 104 are rotating in direction CD1, causing segments 106 with ramps 130 to be compressively engaged between rings 102 and 104 as noted above.

When the vehicle decelerates or enters a coast mode, torque is applied to outer ring 104 in direction CD2 while inner ring 102 and outer ring 104 are still rotating in direction CD1, causing ramps 126 and 132 to be in compressive and frictional contact to transmit the torque. Thus, in both the acceleration and coast modes and in transition between the acceleration and coast modes, clutch 100 remains in the connect mode. Further, in like manner, when clutch 100 is downstream of a transmission, clutch 100 remains in the connect mode when the direction of rotation of rings 102 and 104 is reversed. The above example discussion applies to rotation of ring 102 in direction CD2 by the engine.

As noted above, during the disconnect mode, every segment 106 in clutch 100 is in contact with and urged radially outwardly into contact with ring 104 by at least one of snap rings 108, 110, and 112. Thus, possible unintended transition from a disconnect mode for clutch 100 to a disconnect mode for clutch 100, caused by unintended contact of one or more wedge plate segments 106 with ring 102, is eliminated.

Figure 11:
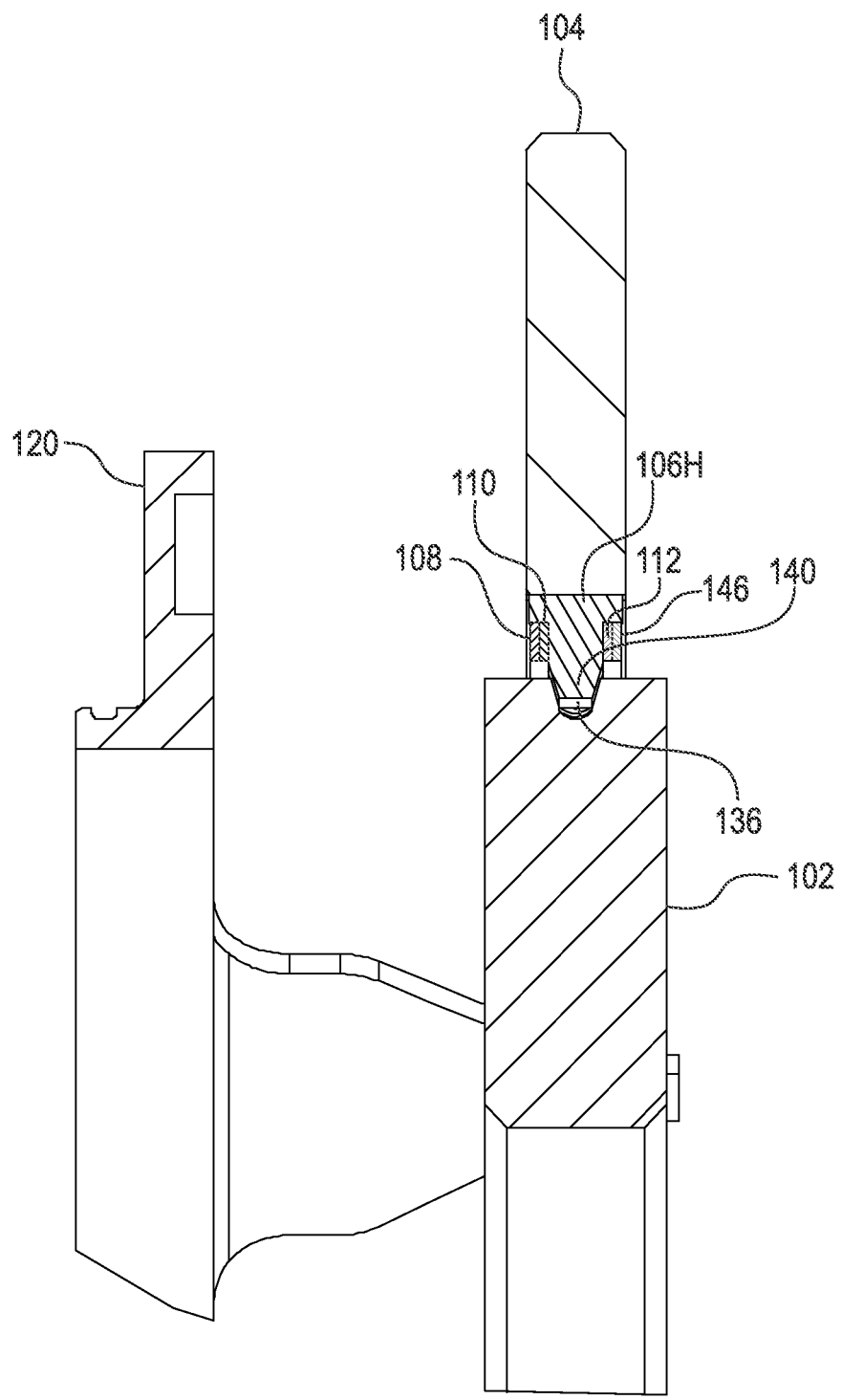
FIG. 11 a cross-sectional view generally along line 4/11-4/11 in FIG. 1 with four off-set snap rings.

FIG. 11 a cross-sectional view generally along line 4/11-4/11 in FIG. 1 with four off-set snap rings.

Figure 12:
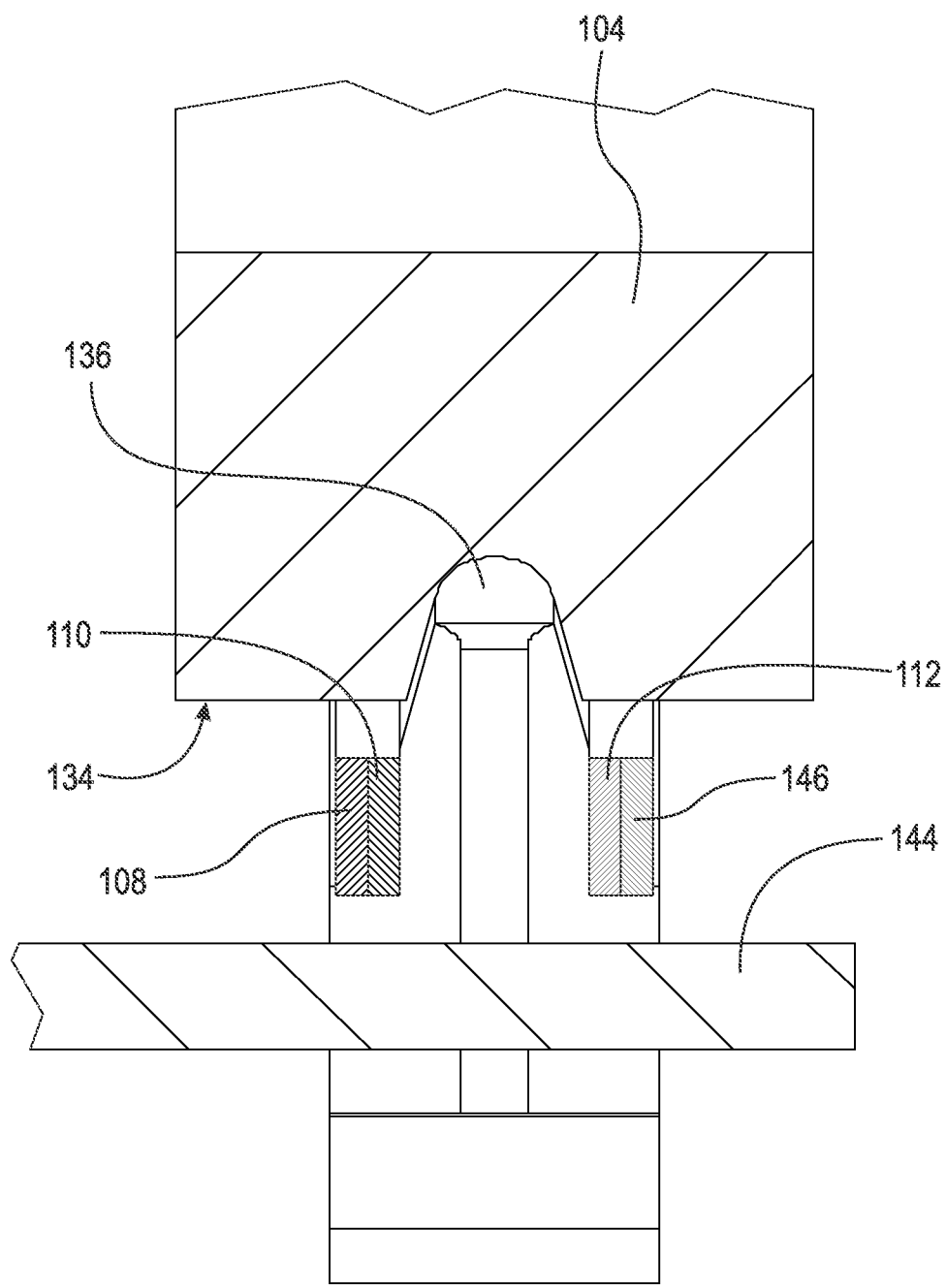
FIG. 12 a cross-sectional view generally along line 5/12-5/12 in FIG. 1 with four off-set snap rings.

FIG. 12 a cross-sectional view generally along line 5/12-5/12 in FIG. 1 with four off-set snap rings.

Figure 13:
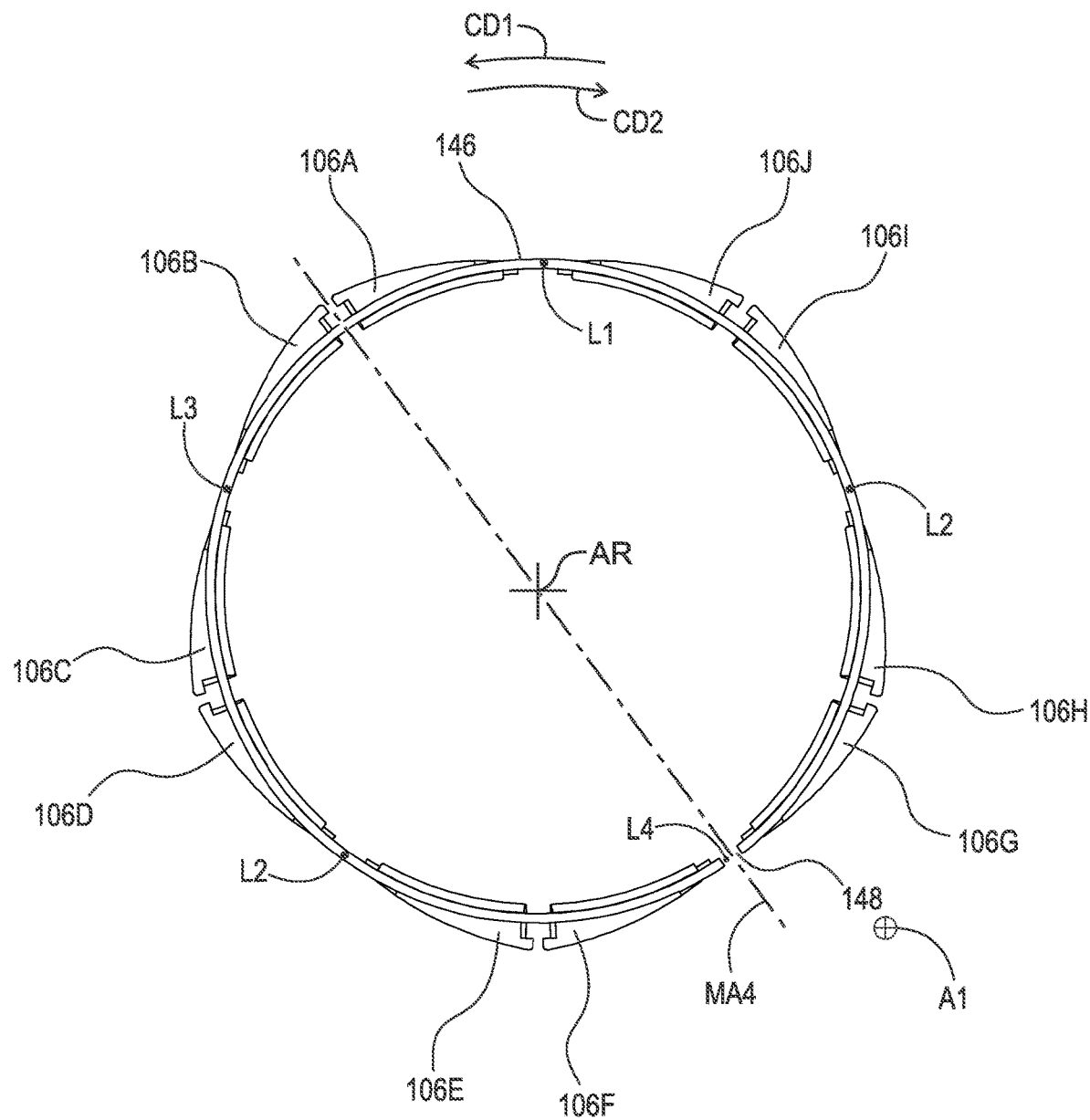
FIG. 13 is a back view of the wedge plate segments and a fourth snap ring for the wedge plate clutch of FIGS. 11 and 12.
Figure 14:
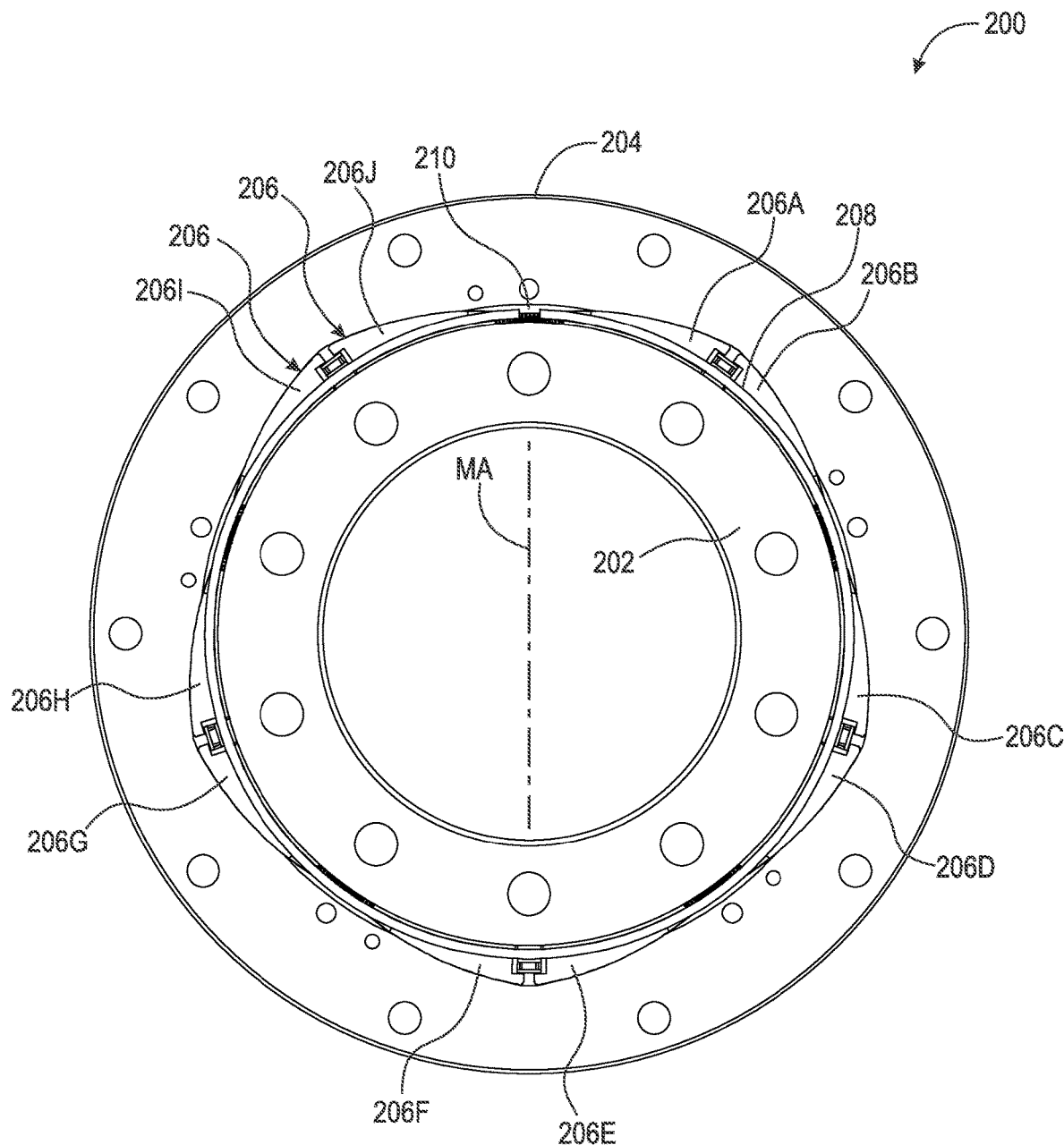
FIG. 14 is a front view of a known wedge plate clutch with a single snap ring; and, FIG. 15 is a perspective view of a cylindrical coordinate system demonstrating spatial terminology used in the present application.

FIG. 13 is a back view of wedge plate segments 106 and snap ring 146 for wedge plate clutch 100 of FIGS. 11 and 12. The following should be viewed in light of FIGS. 1 through 13. In FIG. 11, snap ring 146, including circumferential gap 148, has been added to snap rings 108, 110 and 112 in clutch 100. Gap 148 is circumferentially off-set from gaps 114, 116, and 118. Line L4, parallel to axis AR, passes through gap 148 without passing through gap 114, 116, or 118. Line L4 is represented as a dot in FIG. 12. In the example of FIGS. 11 through 13, gap 148 is located between segments 106F and 106G. Therefore, snap ring 146 urges segments 106F, 106G, 106J, 106A, 106B and 106C radially outwardly into contact with ring 104. Snap ring 146 does not urge segments 106H, 106I, 106D and 106E radially outwardly. Segments 106B, 106C, 106F and 106G are urged radially outward by three snap rings, and segments 106A, 106D, 106E, 106H, 106I, and 106J are urged radially outwardly by two snap rings. Thus, every segment 106 is urged radially outwardly by at least two snap rings. In an example embodiment (not shown), gap 148 is located between segments 106E and 106D.

In an example embodiment, resilient elements 150 (schematically represented in FIG. 2) axially disposed between ring portion 152 of cage 120 and outer ring 104, displace cage 120 in direction AD2 for the transition from the connect mode to the disconnect mode. For example, when actuator A is deactivated, elements 150 displace cage 120 in direction AD2.

Every segment 106 in clutch 100 is in contact with and urged radially outwardly into contact with ring 104 by at least two of snap rings 108, 110, 112, and 146. Thus, possible unintended transition from a disconnect mode for clutch 100 to a disconnect mode for clutch 100, caused by unintended contact of one or more wedge plate segments 106 with ring 102, is eliminated. During operation of clutch 100, centrifugal forces urge segments 106 radially outwardly. Therefore, snap rings 108, 110 and 112 in the configuration of FIGS. 4 and 5 and snap rings 108, 110, 112, and 146 in the configuration of FIGS. 11 and 12 work in conjunction with the centrifugal forces.

It should be understood that clutch 100 is not limited to the configuration shown in FIGS. 1 through 13. For example, clutch 100 can include: a different configuration of wedge plate segments; a different number of pairs of wedge plate segments; different resilient elements or other means for circumferentially urging or restraining wedge plate segments; and/or a different mechanism for initiating the locked and unlocked modes.

In an example embodiment (not shown): ramps 124 and 126 are located on the inner edge of ring 102 and ramps 130 and 132 are located on respective segments 106; groove 136 is disposed in ring 104; segments 106 include protrusions 140 on the respective radially outer edges and disposed in groove 136; and a plurality of snap rings urge each of segments 106 radially inwardly into contact with inner ring 102. Then for example, to transition from the disconnect mode to the connect mode: actuator A displaces cage 120 in direction AD1; and relative rotation between rings 102 and 104 causes the analogous ramps noted above to displace respective segments 106 radially outwardly to initiate or increase frictional contact between segments 106 and ring 104 and circumferentially displace ring 104 and segments 106 with respect to ring 102. To transition from the connect mode to the disconnect mode, cage 120 is displaced in direction AD2 and rotational torque on clutch 100 is removed or reversed.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
L1 axial line
L2 axial line
L3 axial line
L4 axial line
MA1 major snap ring axis
MA2 major snap ring axis
MA3 major snap ring axis
MA4 major snap ring axis
100 wedge plate clutch
102 inner ring
104 outer ring
106 wedge plate segment
106A wedge plate segment
106B wedge plate segment
106C wedge plate segment
106D wedge plate segment
106E wedge plate segment
106F wedge plate segment
106G wedge plate segment
106H wedge plate segment
106I wedge plate segment
106J wedge plate segment
108 snap ring
110 snap ring
112 snap ring
113 pair of wedge plate segments
114 circumferential gap
116 circumferential gap
118 circumferential gap
120 cage
122 radially inner surface, ring 104
124 ramp, surface 122
126 ramp, surface 122
128 radially outer surface, segment 106
130 ramp, surface 128
132 ramp, surface 128
134 radially outer surface, ring 102
136 groove
140 protrusion
142 spring
142A spring
142B spring
144 wedge, cage
144A wedge, cage
145 width, wedge 144
146 snap ring
147 tapered portion, wedge 144
149 distal portion, wedge 144
148 circumferential gap
150 resilient element
152 ring portion, cage
MA major snap ring axis
200 prior art wedge plate clutch
202 inner ring
204 outer ring
206 wedge plate segment
206A wedge plate segment
206B wedge plate segment
206C wedge plate segment
206D wedge plate segment
206E wedge plate segment
206F wedge plate segment
206G wedge plate segment
206H wedge plate segment
206I wedge plate segment
206J wedge plate segment
208 snap ring
210 circumferential gap

The invention claimed is:

1. A wedge plate clutch, comprising:
an axis of rotation;
an inner ring;

an outer ring located radially outwardly of the inner ring;
a first plurality of circumferentially aligned wedge plate segments radially disposed between the inner ring and the outer ring;
a plurality of snap rings urging the first plurality of circumferentially aligned wedge plate segments in a radial direction, the plurality of snap rings including:
a first snap ring with a first circumferential gap; and,
a second snap ring with a second circumferential gap, the second circumferential gap circumferentially off-set from the first circumferential gap; and,
a cage, wherein:
for a disconnect mode for the wedge plate clutch, the inner ring and the outer ring are rotatable with respect to each other; and,
to transition from the disconnect mode to a connect mode for the wedge plate clutch, in which the inner and outer rings are non-rotatably connected, the cage is arranged to displace the first plurality of circumferentially aligned wedge plate segments.

2. The wedge plate clutch of claim 1, wherein no line, parallel to the axis of rotation, passes through the first circumferential gap and the second circumferential gap.

3. The wedge plate clutch of claim 1, wherein the first plurality of circumferentially aligned wedge plate segments includes every circumferentially aligned wedge plate segment in the wedge plate clutch.

4. The wedge plate clutch of claim 1, wherein:
the radial direction is radially outward and,
in the disconnect mode, the first plurality of circumferentially aligned wedge plate segments is in contact with the outer ring.

5. The wedge plate clutch of claim 1, wherein
the first snap ring urges a second plurality of circumferentially aligned wedge plate segments, included in the first plurality of circumferentially aligned wedge plate segments, in the radial direction;
the second snap ring urges a third plurality of circumferentially aligned wedge plate segments, included in the first plurality of circumferentially aligned wedge plate segments, in the radial direction; and,
a wedge plate segment, included in the second plurality of circumferentially aligned wedge plate segments, is not included in the third plurality of circumferentially aligned wedge plate segments.

6. The wedge plate clutch of claim 1, wherein
the first snap ring urges a second plurality of circumferentially aligned wedge plate segments, included in the first plurality of circumferentially aligned wedge plate segments, in the radial direction;
the second snap ring urges a third plurality of circumferentially aligned wedge plate segments, included in the first plurality of circumferentially aligned wedge plate segments, in the radial direction; and,
a wedge plate segment included in the second plurality of circumferentially aligned wedge plate segments is included in the third plurality of circumferentially aligned wedge plate segments.

7. The wedge plate clutch of claim 1, wherein:
the plurality of snap rings includes a third snap ring with a third circumferential gap; and,
the third circumferential gap is circumferentially off-set from the first circumferential gap and from the second circumferential gap.

8. The wedge plate clutch of claim 7, wherein no line, parallel to the axis of rotation, passes through:
the first gap and the third gap; or,
the second gap and the third gap.

9. The wedge plate clutch of claim 7, wherein:
the first snap ring urges a second plurality of circumferentially aligned wedge plate segments, included in the first plurality of circumferentially aligned wedge plate segments, in the radial direction;
the second snap ring urges a third plurality of circumferentially aligned wedge plate segments, included in the first plurality of circumferentially aligned wedge plate segments, in the radial direction;
the third snap ring urges a fourth plurality of circumferentially aligned wedge plate segments, included in the first plurality of circumferentially aligned wedge plate segments, in the radial direction;
a first wedge plate segment:
is included in two of the second, third and fourth pluralities of circumferentially aligned wedge plate segments; and,
is not included in the remaining second, third or fourth plurality of circumferentially aligned wedge plate segments; and,
a second wedge plate segment is included in each of the second, third and fourth pluralities of circumferentially aligned wedge plate segments.

10. The wedge plate clutch of claim 7, wherein:
the plurality of snap rings includes a fourth snap ring with a fourth circumferential gap; and,
the fourth circumferential gap is circumferentially off-set from the first circumferential gap, from the second circumferential gap, and from the third circumferential gap.

11. The wedge plate clutch of claim 10, wherein no line, parallel to the axis of rotation, passes through:
the first gap and the fourth gap; or,
the second gap and the fourth gap; or,
the third gap and the fourth gap.

12. The wedge plate clutch of claim 1, wherein
the outer ring includes a radially inner surface including a plurality of first ramps, each first ramp sloping radially inwardly along a first circumferential direction;
the first plurality of circumferentially aligned wedge plate segments includes a plurality of pairs of circumferentially aligned wedge plate segments;
one wedge plate segment in each pair of circumferentially aligned wedge plate segments includes a radially outer surface including a second ramp, the second ramp sloping radially inwardly along the first circumferential direction;
in the connect mode, the inner ring, the first plurality of circumferentially aligned wedge plate segments and the outer ring are non-rotatably connected; and,
to initiate the connect mode:
the cage displaces each second ramp along a respective first ramp in the first circumferential direction; and,
the plurality of first ramps displaces the one wedge plate segment in each pair of circumferentially aligned wedge plate segments radially inwardly into compressive engagement with the inner ring.

13. The wedge plate clutch of claim 12, wherein to transition from the connect mode to the disconnect mode, the plurality of snap rings pushes the first plurality of circumferentially aligned wedge plate segments radially outwardly to reduce or eliminate contact between the first plurality of circumferentially aligned wedge plate segments and the inner ring.

14. The wedge plate clutch of claim 12, wherein
the radially inner surface includes a plurality of third ramps, each third ramp sloping radially inwardly along the second circumferential direction;
an other wedge plate segment in said each pair of circumferentially aligned wedge plate segments includes a radially outer surface including a fourth ramp, the fourth ramp sloping radially inwardly along the second circumferential direction; and,
to initiate the connect mode:
the cage displaces each fourth ramp along a respective third ramp in the second circumferential direction; and,
the plurality of third ramps displaces the other wedge plate segment in said each pair of circumferentially aligned wedge plate segments radially inwardly into compressive engagement with the inner ring.

15. A wedge plate clutch, comprising:
an axis of rotation;
an inner ring;
an outer ring located radially outwardly of the inner ring;
a first plurality of circumferentially aligned wedge plate segments radially disposed between the inner ring and the outer ring and including a first wedge plate segment and a second wedge plate segment;
a plurality of snap rings urging the first plurality of circumferentially aligned wedge plate segments in a radial direction, the plurality of snap rings including:
a first snap ring urging the first wedge plate segment in the radial direction; and,
a second snap ring urging the second wedge plate segment in the radial direction; and,
a cage, wherein:
the first snap ring does not urge the second wedge plate segment in the radial direction;
for a disconnect mode for the wedge plate clutch, the inner ring and the outer ring are rotatable with respect to each other; and,
to transition from the disconnect mode to a connect mode for the wedge plate clutch, in which the inner and outer rings are non-rotatably connected, the cage is arranged to circumferentially displace the first plurality of circumferentially aligned wedge plate segments.

16. The wedge plate clutch of claim 15, wherein:
the first snap ring includes a first circumferential gap;
the second snap ring includes a second circumferential gap; and,
an entirety of the first circumferential gap is circumferentially off-set from the second circumferential gap.

17. The wedge plate clutch of claim 15, wherein the first plurality of circumferentially aligned wedge plate segments includes a third wedge plate segment, the wedge plate clutch further comprising:
a third snap ring urging the third wedge plate segment in the radial direction, wherein:
the first snap ring includes a first circumferential gap;
the second snap ring includes a second circumferential gap;
the third snap ring includes a third circumferential gap; and,
no line, parallel to the axis of rotation passes through:
the first and second circumferential gaps; or,
the first and third circumferential gaps; or,
the second and third circumferential gaps.

18. The wedge plate clutch of claim 15, wherein the first plurality of circumferentially aligned wedge plate segments includes a third wedge plate segment, the wedge plate clutch further comprising:
a third snap ring urging the third wedge plate segment in the radial direction, wherein:
the first snap ring urges the third wedge plate segment in the radial direction; or,
the second snap ring urges the third wedge plate segment in the radial direction.

19. The wedge plate clutch of claim 15, further comprising:
a third snap ring, wherein every wedge plate segment included in the first plurality of circumferentially aligned wedge plate segments is urged in the radial direction by at least two of the first, second and third snap rings.

20. A wedge plate clutch, comprising:
an axis of rotation;
an inner ring;
an outer ring located radially outwardly of the inner ring;
a plurality of circumferentially aligned wedge plate segments radially disposed between the inner ring and the outer ring;
a plurality of snap rings urging the plurality of circumferentially aligned wedge plate segments in a radial direction, the plurality of snap rings including:
a first snap ring with a first circumferential gap;
a second snap ring with a second circumferential gap; and,
a third snap ring with a third circumferential gap; and,
a cage, wherein:
no line, parallel to the axis of rotation passes through:
the first and second circumferential gaps; or,
the first and third circumferential gaps; or,
the second and third circumferential gaps;
for a disconnect mode for the wedge plate clutch, the inner ring and the outer ring are rotatable with respect to each other; and,
to transition from the disconnect mode to a connect mode for the wedge plate clutch, in which the inner and outer rings are non-rotatably connected, the cage is arranged to displace the plurality of circumferentially aligned wedge plate segments.

* * * * *